Figure 1:
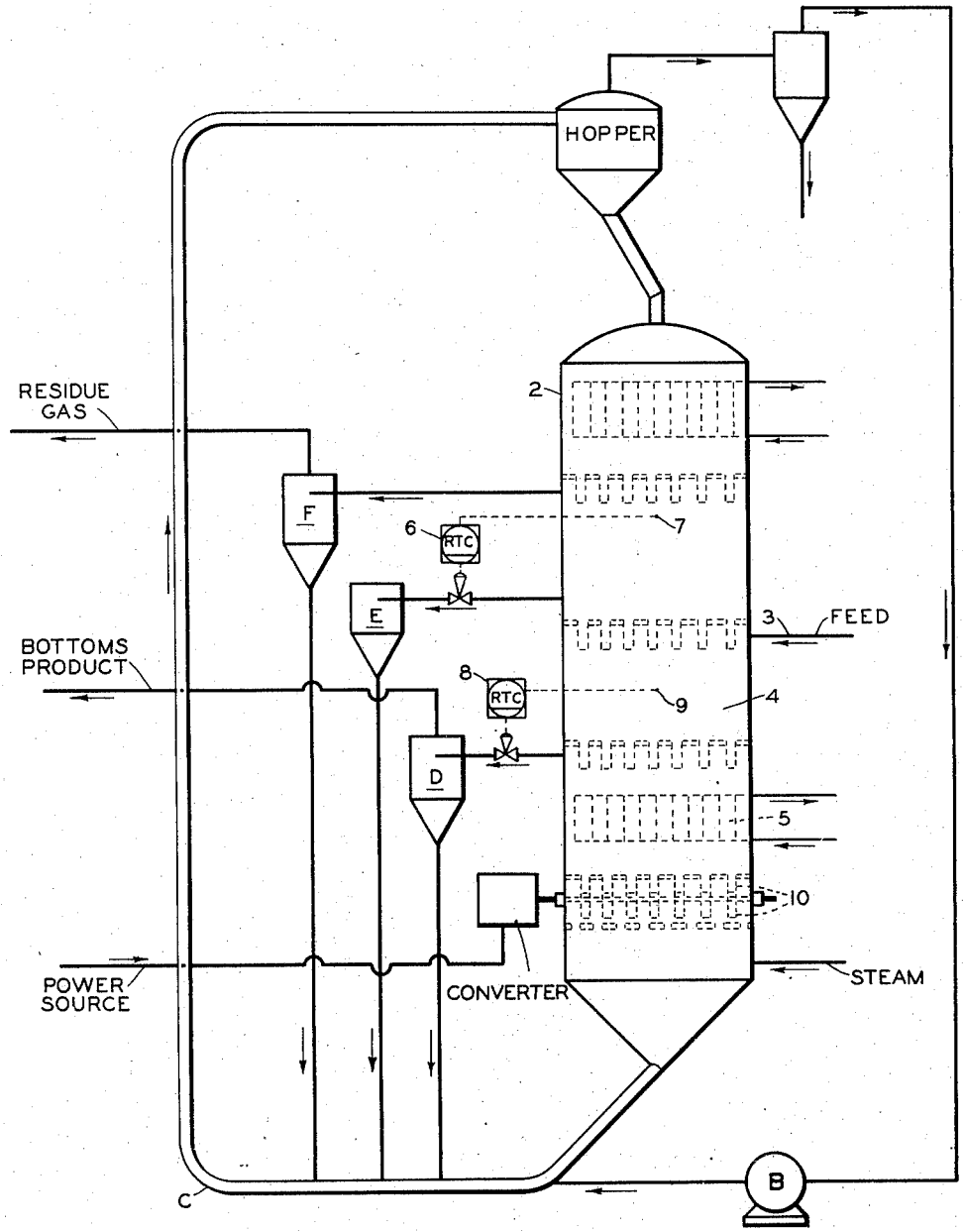

INVENTORS.
A. J. MILLER
J. L. GROEBE

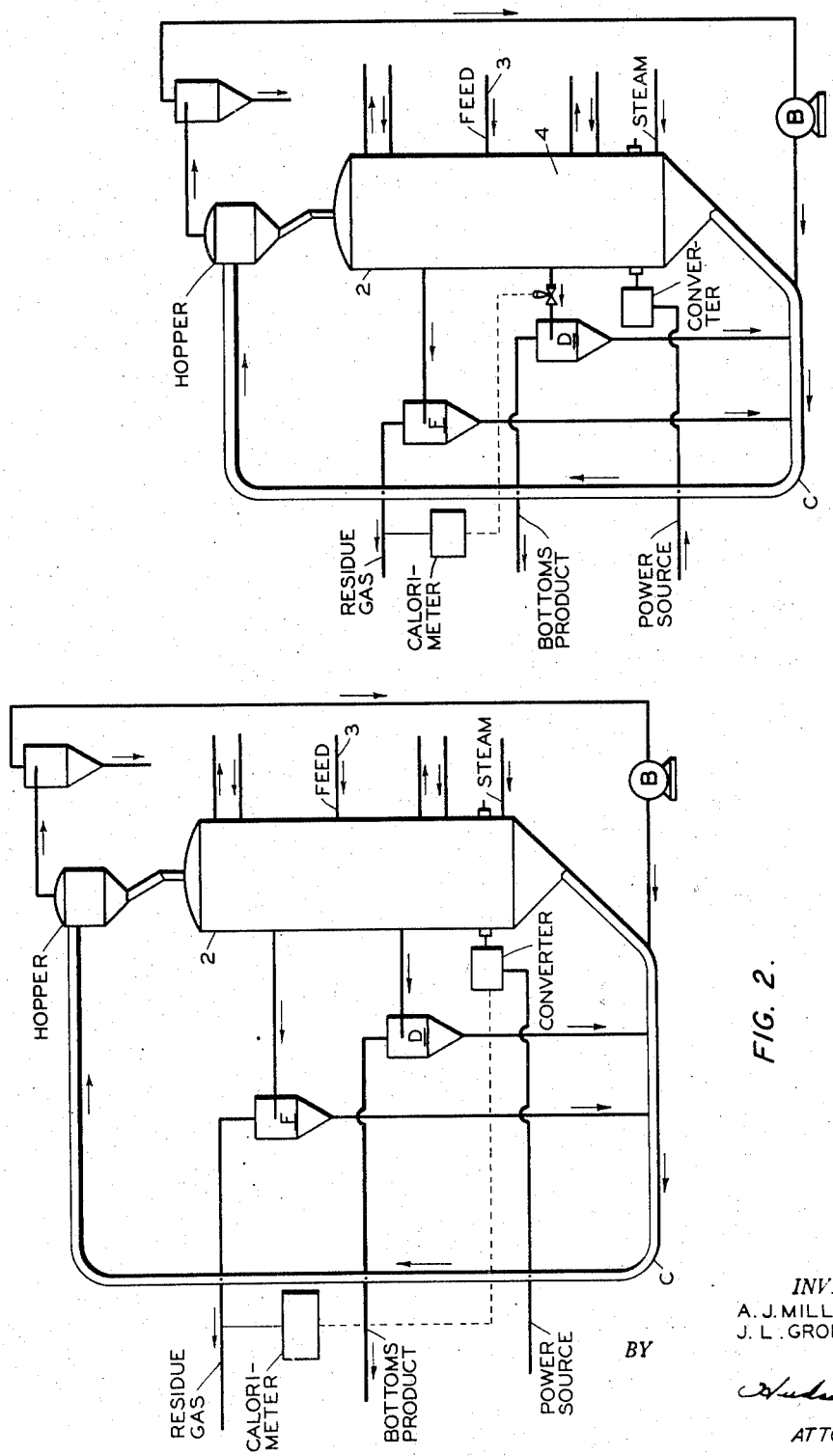

Patented Aug. 7, 1951

2,563,543

UNITED STATES PATENT OFFICE 2,563,543

METHOD AND APPARATUS FOR CONTROLLING BRITISH THERMAL UNIT VALUE

Alvin J. Miller and John L. Groebe, Bartlesville, Okla., assignors to Phillips Petroleum Company, a corporation of Delaware Application August 26, 1949, Serial No. 112,518

3 Claims. (Cl. 183—4.2)

This invention relates to a method for the precise concentration and separation of components of gases employing an adsorbent, for example activated charcoal. In one of its aspects the invention relates to a method and apparatus for effecting the concentration and separation of components of a gaseous mixture by means of which the composition of a gas stream leaving the tower can be closely and readily controlled.

The invention is applicable to the so-called "Hypersorption" adsorptive process methods wherein gases such as natural gases, or an oil refinery gas stream, are treated for the concentration and separation of certain of their components. Thus a feed stream to an adsorber in which gases are thus treated can consist of the saturated hydrocarbons methane, ethane, propane and butane with a small proportion of pentanes together with nitrogen, carbon dioxide, hydrogen sulfide and mercaptans in the case of a natural gas, and of hydrogen, methane, ethane, ethylene, propane, propylene, butanes and butylenes in the case of an oil refinery vapor stream.

In said adsorption processes there is utilized a bed of activated adsorbent, for example freshly activated charcoal which is passed from a hopper at the top of an adsorber tower down into and through the tower and back to the hopper. Regeneration or reactivating means can be employed to periodically regenerate the adsorbent. In the tower are provided in line of flow of the adsorbent, a cooling section which reduces the temperature of the adsorbent to about 120° F., or below, an adsorption zone wherein feed gases are contacted in counter-current flow with the adsorbent to selectively adsorb the gases; a rectifying zone wherein the adsorbed gases are rectified by upflowing reflux of bottoms product which serves to displace from the adsorbent any of the undesired lighter components originally adsorbed from the feed; steaming and stripping sections wherein the adsorbent and adsorbed gases subjected to the action of steam and heat to strip from the adsorbent the last remaining gas or gases. The hot stripped adsorbent passes through a specially designed feed mechanism which provides a positive control of the adsorbent flow through the tower. From this mechanism, the adsorbent drops into a sealing leg which restricts the flow of steam downwardly from the tower. A gas-lift raises the hot adsorbent to the aforementioned hopper when the cycle is again repeated. A gas stream is taken off at the top, at the side and at the bottom of the tower. These streams are referred to as the discharge or residue gas stream, the side-cut stream and the bottoms or "make-gas" stream, respectively.

In operation of the adsorber tower there is obtained a phenomenon known as a temperature break which is at a rather well defined level and which indicates a decided change in composition of the gases in the tower at that level. Temperature responsive elements set at such a level and employed in conjunction with a controller mechanism are employed to control flows from the tower. For example the side-cut and bottoms streams are so controlled by placing a temperature recorder controller in the adsorption and in the rectifying sections, respectively. This method of control is well suited to the recovery of substantially all of a desired component from a feed stream, for example, all of the propane from a natural residue-gas or all of the ethylene from a refinery vapor.

However, we have found in the recovery of a desired portion of a given component from the feed stream, that temperature recorder controls are inapplicable because it is possible for the temperature break to pass above the temperature responsive element and once this has occurred there is no way to determine the percentage of the desired component moving to the top of the tower.

In the natural gas and other gas industries the supply of certain gas mixtures of predetermined composition is of the greatest present importance. Thus, in supplying to pipe-lines the overhead gas from an adsorption unit for use in a petrochemical process, it is extremely important that its composition remain fixed at a specified value. Also, many gas sale contracts are written on a certain percentage propane content in the gas.

We have found further that there is a good correlation between the composition of the gases leaving the adsorber and their heat content. Thus, we have found that it is possible to control the composition of the discharge gas by employing a controller calorimeter to correlate the heat value of said discharge gas with the motion or flow of the adsorbent through the tower. Thus, the controller calorimeter can be operatively connected to the power source of the feed mechanism to either increase or decrease the adsorbent flow through the tower depending upon whether there is being obtained in the discharge gas too much or too little of the desired component, say propane. Similarly it is possible to control the rate of flow of the side-cut gas stream responsive to variation in the composition of the discharge gas by causing the controller calorimeter to vary in a correlated manner the discharge valve on the side-cut withdrawal conduit.

When the adsorber system is operated employing a controller calorimeter to control the composition of the discharge gas stream by varying the rate of flow of adsorbent through the tower, or the rate of withdrawal of said side-cut stream from the tower, as above-described, the composition of the said gas stream remains substantially constant due to the responsiveness of the system to any changes of said composition. The prior art operation employing temperature recorder controllers cannot be applied to accomplish the result of this invention because the prior art system is dependent upon a temperature break, as described, and when controlling the composition of the discharge gas stream there is no temperature break at which the prior art temperature recorder controls can be made responsive.

Thus, according to this invention there is provided a method and apparatus for controlling the composition of a gas stream leaving an adsorber, adapted to process a mixture of gaseous materials to concentrate and to separate from said gaseous mixture one or more of its components, the said adsorber containing a moving bed of adsorbent material, which comprises varying the flow from said adsorber of one of the said materials present in said adsorber in a manner correlated with the composition and consequently the heat value of said gas stream.

Therefore, according to this invention there is provided a method and apparatus for controlling the composition of a gas stream leaving an adsorber, as stated, in such a manner that a feed stream is passed into an adsorption zone wherein it is passed in countercurrent contact with a moving bed of adsorbent and in which said feed is separated into at least two product streams, an overhead gas stream, comprising substantially all of at least one of the components of said feed together with a predetermined portion of a second component of said feed, and a second product stream withdrawn from another point of said adsorption zone, containing the remaining portion of said second component together with substantially all of the high boiling components in said feed, controlling the portion of said second component in said overhead product by continuously measuring the heat value of said overhead product and regulating the flow of one of said adsorbent and said second product stream in a manner correlated with the heat value of said overhead gas stream to maintain a desired portion of said second component in said overhead gas stream.

To more fully describe and to illustrate the invention, reference is now made to the drawing which represents in the figures thereof, respectively, a prior art adsorber system, an adsorber system according to the invention in which the residue or discharge gas stream composition is controlled by means of a controller calorimeter which varies the rate of flow of adsorbent through and from the tower responsive to change in said composition, and an adsorber system according to the invention in which the side-cut gas stream flow from the adsorber is controlled by means of a controller calorimeter which varies said flow from the adsorber responsive to change in said composition of the said discharge-gas. The drawings are largely diagrammatic, certain details not required to illustrate the present invention having been omitted for sake of clarity.

In the drawings, Figure 1 shows diagrammatically a typical adsorber unit in which 2 is a tower or adsorber filled with downwardly moving activated carbon, charcoal or other suitable adsorbent. Feed enters the tower 2, through conduit 3. The feed can be a mixture of hydrocarbons, such as those available in gasoline plants processing natural gas to recover gasoline therefrom or a refinery vapor containing ethylene and other olefins and paraffins and hydrogen. Thus, a feed stream to the adsorber can be the residue-gas from a gasoline recovery plant and may contain some nitrogen, carbon dioxide, hydrogen sulfide and hydrocarbons having from one to, say, four carbon atoms per molecule, that is methane, ethane, propane and butane. Such a residue gas may be advantageously processed through a selective adsorption zone for recovery and purification of ethane and propane and butane.

Components of the feed mixture are adsorbed by the carbon bed forming a so-called "fat" carbon carrying adsorbed hydrocarbons. The fat carbon moves downward into the lower part of the tower, a part of which serves as a rectifying section 4. In this section any of the lighter overhead components are displaced by reflux created by stripper section 5 which is steam heated and as the carbon moves down through it, it will liberate the more volatile gases such as ethane first which passes upwardly as a reflux and which may be concentrated and withdrawn as a side-cut. Methane will travel up through the tower and out at the top, ethane can be concentrated and withdrawn as a side-cut from a locus just below the feed introduction level, or levels, and propane and heavier can be withdrawn as a bottoms product. Steam can be introduced directly into the tower to aid in the desorption of the gas from the adsorbent. Control of the tower is effected by controlling the reflux moving up the column to a level just below the feed entry. The control of the reflux is, in turn, effected by controlling the bottoms product or side-cut withdrawal rate. This is accomplished by means of a temperature recorder controller 6 responsive to the temperature at a point 7 in the adsorption section of the tower. The rate of withdrawal of the bottoms product, sometimes referred to as "rich gas" or "make gas" is likewise effected with a temperature recorder controller 8 responsive to the temperature at a point 9 in the rectifying section of the tower or column. The flow of adsorbent down through and from the bottom of the tower is controlled by means of a specially designed mechanism which comprises a circular tray supported at three points and given an oscillating motion. This tray has a number of downspouts which serve as pockets for the conveyance of solids. These downspouts are so aligned with corresponding tubes and slots in stationary trays above and below that half the downspouts are filling and half discharging at each end of the reciprocating stroke, thus controlling the flow of the granular activated carbon or adsorbent therethrough. Depending upon the frequency of oscillation of the movable trays or plates, this flow can be varied as desired. The drawing shows a power source and a converter which serves to translate the power into an oscillating movement of the movable plate.

The adsorbent withdrawn from the tower is returned to the top thereof by way of a hopper or storage bin to which the adsorbent is lifted by means of blower B which blows residue-gas into pipe or lift C picking up the adsorbent flowing into it from the tower. Cyclone-separators D, E and F separate any entrained adsorbent from the gases leaving the tower.

Figure 2 shows an adsorber modified according to the present invention. In this modification a hydrocarbon-containing feed is treated to produce a residue-gas of a constant predetermined composition and a bottoms product containing the remainder of the hydrocarbons. According to the invention the system is provided with a controlling calorimeter which controls the frequency of the movable plate and therefore, the rate of flow of adsorbent through the adsorber responsive to any variation of the composition and, therefore, the B. t. u. value of the residue-gas. To this end, a minor portion of the residue-gas is continuously bled from the residue-gas discharge pipe and conducted to the calorimeter which translates the heat-value of the gas into energy which is used to control the movable plate operating means, usually a steam actuated piston-cylinder device. The details of a controller calorimeter are set forth in copending application Serial No. 757,261 filed June 26, 1947, now Patent 2,465,458 dated March 19, 1949, by John M. Ribble.

Thus, according to the invention, any change in the composition of the residue-gas will cause a corresponding change in the rate of flow of the adsorbent through the tower. The controller calorimeter is so adapted to the actuating means that an undesired increase in a component of the residue-gas will cause an increase in the rate of flow of the adsorbent through the adsorber and vice-versa. Therefore, when an increase in content of the said component of the residue-gas occurs, and this component is now above the predetermined desired value, the flow of adsorbent will be correspondingly increased and more of the said component of the feed gas will be found in the bottoms. Likewise, an undesired decrease in said component of the residue-gas will be counter-balanced by a decreased flow of the adsorbent.

Figure 3 shows diagrammatically the arrangement wherein the controller-calorimeter is adapted to operate the bottoms outlet valve.

Reasonable variation and modification are possible within the scope of the above disclosure and the appended claims to the invention, the essence of which is that the flow from a gas-adsorption-concentration and separation zone of either the adsorbent material therein and/or a gas stream therefrom is varied in a manner and by means correlated with the composition of the residue-gas therefrom to control said composition to a constant predetermined value.

We claim:

1. In a gas adsorption, concentration and separation apparatus comprising in combination, an adsorber tower having a gas inlet means located intermediate its ends, a gas outlet above said gas inlet and at least one controlled gas outlet at a point below said gas inlet, feeder means for passing an adsorbent downwardly through said tower, regulating means for regulating the rate of passage of said adsorbent through said tower, a controller calorimeter responsive to the composition of gas in said gas outlet above said gas inlet so adapted and arranged as to maintain said composition of gas constant by controlling at least one of said controlled gas outlet below said gas inlet and said regulating means.

2. In a gas adsorption concentration and separation method wherein a gas mixture is passed into an adsorber zone through which an adsorbent is moving in a downwardly direction and in which the said mixture is separated into at least two gas streams, an upper gas stream and a lower gas stream, and wherein said upper gas stream contains substantially all of at least one of the components of said mixture together with a predetermined portion of a second component of said mixture and said lower gas stream contains the remaining portion of said second component together with substantially all higher boiling components in said mixture, the steps of controlling the portion of said second component in said upper gas stream by continuously measuring the heat value of said upper gas stream and regulating the flow of one of said adsorbent and said lower gas stream in a manner correlated with the heat value of said upper gas stream to maintain a substantially constant desired portion of said second component in said upper gas stream.

3. In a gas adsorption, concentration and separation apparatus comprising in combination, an adsorber tower having a gas inlet means located intermediate its ends, a gas outlet above said gas inlet and at least one controlled gas outlet at a point below said gas inlet, feeder means for passing an adsorbent downwardly through said tower, regulating means for regulating the rate of passage of said adsorbent through said tower, operating means responsive to the composition of gas in said gas outlet above said gas inlet so adapted and arranged as to maintain said composition of gas constant by operating at least one of said controlled gas outlet below said gas inlet and said regulating means.

ALVIN J. MILLER.
JOHN L. GROEBE.

REFERENCES CITED

The following references are of record in the file of this patent:

UNITED STATES PATENTS

| Number | Name | Date |
|---|---|---|
| 1,422,007 | Soddy | July 4, 1922 |
| 1,522,480 | Allen | Jan. 13, 1925 |
| 1,704,101 | Pinkerton | Mar. 5, 1929 |
| 2,211,162 | Ray | Aug. 13, 1940 |
| 2,462,995 | Ritzmann | Mar. 1, 1949 |

OTHER REFERENCES

"Hypersorption Process," Clyde Berg, A. I. Ch. E. Transactions, vol. 42, #4, August 1946, pages 665–680.

Certificate of Correction

Patent No. 2,563,543                                                     August 7, 1951

ALVIN J. MILLER ET AL.

It is hereby certified that error appears in the printed specification of the above numbered patent requiring correction as follows:

Column 5, line 25, for "Patent 2,465,458 dated March 19, 1949" read *Patent 2,564,791 dated August 21, 1951*;

and that the said Letters Patent should be read as corrected above, so that the same may conform to the record of the case in the Patent Office.

Signed and sealed this 19th day of February, A. D. 1952.

[SEAL]

THOMAS F. MURPHY,
*Assistant Commissioner of Patents.*